United States Patent
Wen et al.

(10) Patent No.: US 7,561,560 B2
(45) Date of Patent: Jul. 14, 2009

(54) SYMBOL TIMING SYNCHRONIZATION SYSTEM FOR ORTHOGONAL FREQUENCY DIVISION MULTIPLEXING SYSTEMS

(75) Inventors: Jyh-Horng Wen, Chiayi County (TW); Chih-Peng Li, Kaohsiung (TW); Ming-Li Wang, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 314 days.

(21) Appl. No.: 11/143,954

(22) Filed: Jun. 3, 2005

(65) Prior Publication Data

US 2006/0182081 A1    Aug. 17, 2006

(30) Foreign Application Priority Data

Feb. 17, 2005    (TW) .............................. 94104711 A

(51) Int. Cl.
*H04J 3/06*    (2006.01)
*H04B 7/212*   (2006.01)

(52) U.S. Cl. ...................... 370/350; 370/324; 370/503; 375/355

(58) Field of Classification Search ................ 370/324, 370/345, 350, 503, 338, 504; 375/260, 326, 375/343, 355, 362
See application file for complete search history.

(56) References Cited

U.S. PATENT DOCUMENTS

| | | | | |
|---|---|---|---|---|
| 5,548,613 A * | 8/1996 | Kaku et al. | ................ | 375/150 |
| 5,555,247 A * | 9/1996 | Matsuoka et al. | ........... | 370/350 |
| 5,596,582 A * | 1/1997 | Sato et al. | .................... | 370/509 |
| 5,991,289 A * | 11/1999 | Huang et al. | ................ | 370/350 |
| 6,125,124 A * | 9/2000 | Junell et al. | ................. | 370/503 |
| 6,172,993 B1 * | 1/2001 | Kim et al. | .................... | 370/516 |
| 6,614,864 B1 * | 9/2003 | Raphaeli et al. | ............. | 375/371 |
| 6,831,960 B2 * | 12/2004 | Ohsawa | ...................... | 375/357 |
| 7,020,116 B1 * | 3/2006 | Nakada | ...................... | 370/338 |
| 7,058,151 B1 * | 6/2006 | Kim | ........................... | 375/355 |
| 2004/0087282 A1* | 5/2004 | Ishikawa | .................... | 455/101 |
| 2005/0063298 A1* | 3/2005 | Ling et al. | ................. | 370/208 |

* cited by examiner

*Primary Examiner*—Quochien B Vuong
(74) *Attorney, Agent, or Firm*—Volentine & Whitt, PLLC

(57) ABSTRACT

The invention relates to a symbol timing synchronization system for orthogonal frequency division multiplexing system. According to the invention, the symbol timing synchronization system utilizes a shift register and a comparing device to determine whether the symbol of the orthogonal frequency division multiplexing system has the inter-symbol interference. When the symbol has the inter-symbol interference, a compensator is utilized to compensate the interfered symbol. Therefore, depending on the symbol timing synchronization system of the invention, the symbol timing error and the inter-symbol interference can be essentially removed so as to improve the system performance.

6 Claims, 3 Drawing Sheets

SYMBOL TIMING SYNCHRONIZATION SYSTEM FOR ORTHOGONAL FREQUENCY DIVISION MULTIPLEXING SYSTEMS

BACKGROUND OF THE INVENTION

1. Field of the Invention

The invention relates to orthogonal frequency division multiplexing systems, particularly to a symbol timing synchronization system for orthogonal frequency division multiplexing systems.

2. Description of the Related Art

In orthogonal frequency division multiplexing (OFDM) systems, the symbol timing synchronization of the receiving end is an essential issue. Referring to U.S. Pat. No. 5,991,289 and Taiwan Patent Publication No. 400675, wherein a correlator is used to obtain the correlation between samples, the phase value of the correlation is obtained by an arithmetic device, and the transition point of phases output by the arithmetic device or the maximum of the output phase is detected through a detecting device, so as to obtain the correct symbol timing synchronization point and achieve the timing synchronization.

Nevertheless, according to Taiwan Patent Publication No.429719, the timing synchronization point is obtained by the frequency domain correlation. Taiwan Patent Publication No. 421928 utilizes that when the delay of time domain in the multi-carrier digital modulation system transformed into the frequency domain, it will be changed into another appended carrier signal, and because the carrier frequency offset is proportional to the time delay length produced by multi-path interference, the time delay length can be precisely detected by this relation, thereby achieving the symbol timing synchronization.

With reference to FIG. 1, a schematic view of a conventional OFDM system 10 is shown. The conventional OFDM system 10 comprises a transmitting end serial-to-parallel circuit 11, an inverse fast Fourier transformer 12, a transmitting end parallel-to-serial circuit 13, a Cyclic Prefix (CP) inserter 14, a channel 15, a CP remover 16, a receiving end serial-to-parallel circuit 17, a fast Fourier transformer 18 and a receiving end parallel-to-serial circuit 19. Wherein the transmitting end serial-to-parallel circuit 11, the inverse fast Fourier transformer 12, the transmitting end parallel-to-serial circuit 13, the CP inserter 14 and the channel 15 are disposed on the transmitting end of the OFDM system 10. The CP remover 16, the receiving end serial-to-parallel circuit 17, the fast Fourier transformer 18 and the receiving end parallel-to-serial circuit 19 are disposed on the receiving end of the OFDM system 10.

On the receiving end of a conventional OFDM system, the timing of each symbol must be synchronized. However, the environment of wireless communication is complex and changes rapidly so that an ideal timing synchronization can't be achieved. When the timing synchronization can't reach an ideal timing point, a timing error tends to occur. If the timing error is within the acceptable range of the OFDM system, the performance of the system will not be seriously affected. However, once the timing error is beyond the acceptable range, the performance of the system will be affected seriously, thereby producing a series of reductions in the system performance.

Furthermore, a timing error occurs when the timing synchronization can't be achieved. If the timing error is beyond the acceptable range, the received symbol through the fast Fourier Transformer 18 has not only a phase error but also the Inter-Symbol Interference (ISI), and the ISI effect serially and seriously affects the performance of the system. The disadvantage in the conventional technique is that when Fourier transform demodulation are performed on the receiving end, if it is found that a symbol has an ISI, the OFDM system does not eliminate the ISI effect, and therefore the performance of the whole system is affected.

Therefore, there is a need to provide a creative and progressive symbol timing synchronization system to solve the problems mentioned above.

SUMMARY OF THE INVENTION

One object of the invention is to provide a symbol timing synchronization system for OFDM systems, comprising a shift register, a comparing device and a compensator. The shift register is used to store adjacent first and second symbols and receive a symbol index. According to the symbol index and a set value, the symbol index minus the set value is a first pointer, the symbol index is a second pointer, and the symbol index plus the set value is a third pointer. According to the first pointer, the second pointer and the third pointer, a first content value, a second content value and a third content value are obtained respectively. The comparing device is used to compare the first content value, the second content value and the third content value, so as to determine whether the first symbol is interfered. If the first symbol is interfered, the compensator is used to compensate the interfered first symbol.

Therefore, the symbol timing synchronization system of the invention can detect whether the symbol of the OFDM system has ISI. When the symbol has ISI, the symbol timing synchronization system of the invention can automatically compensate the interfered symbol by replacing the sample not in the symbol with a sample in the symbol with less difference. Therefore, depending on the symbol timing synchronization system of the invention, the timing error and the ISI can be essentially removed so as to improve system performance.

DETAILED DESCRIPTION OF THE INVENTION

Figure 1:
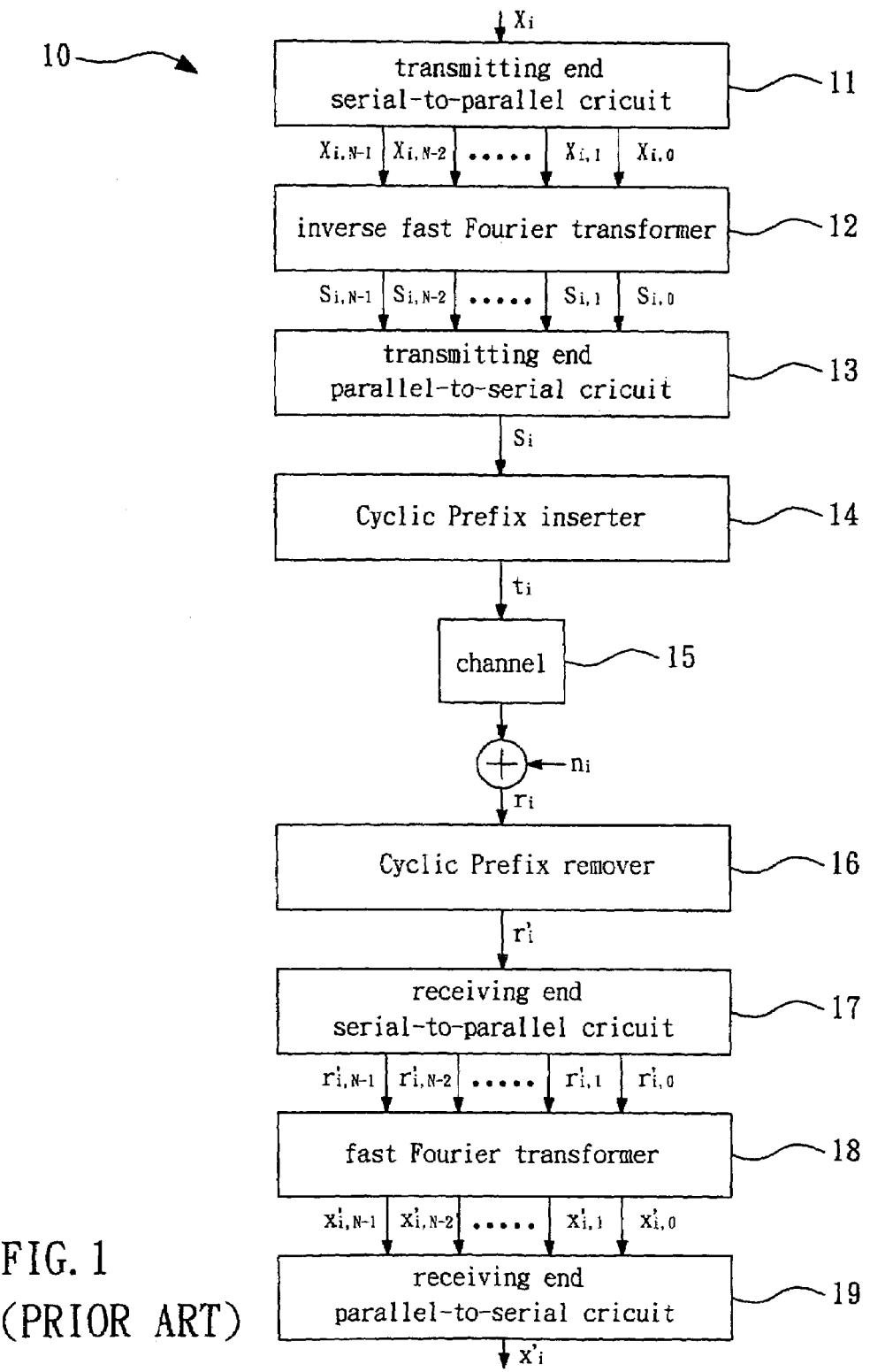
FIG. 1 is a schematic view of a conventional OFDM system.
Figure 2:
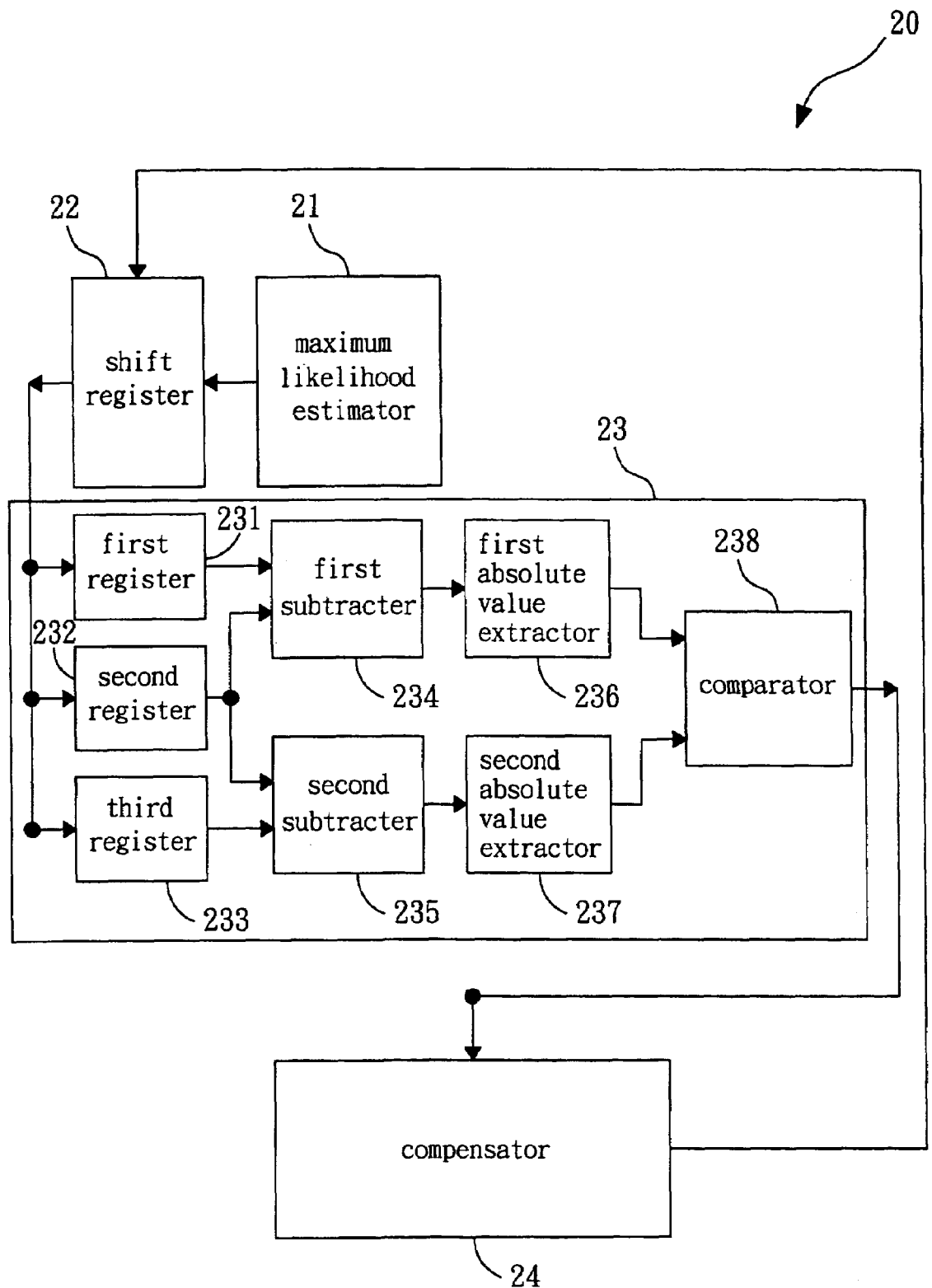
FIG. 2 is a schematic view of a symbol timing synchronization system for an OFDM system according to the invention.

With reference to FIG. 2, a schematic view of a symbol timing synchronization system 20 for OFDM systems according to the invention is shown. Also with reference to FIG. 1, the symbol timing synchronization system 20 of the invention can be applied to a conventional OFDM system 10, and it is disposed ahead of the CP remover 16 so that the symbol timing synchronization system 20 of the invention can compensate the interference of symbol before the CP remover 16 removes the CP of the symbol and when the symbol occurs with the timing non-synchronization and timing error.

The symbol timing synchronization system 20 of the invention comprises a maximum likelihood estimator 21, a shift register 22, a comparing device 23 and a compensator 24. The maximum likelihood estimator 21 obtains a correlation between received symbols, and finds out the maximum correlation, so as to output a symbol index with the maximum correlation to the shift register. The symbol index is used to indicate the last sample of the symbol.

The shift register 22 is used to receive the symbol index from the maximum likelihood estimator 21, and store a first symbol and a second symbol being adjacent to the first symbol. The symbol index is the address (n) of the last sample of the first symbol. Both the first symbol and the second symbol have a CP and a data, wherein the first symbol has the first CP and the first data, and the length of the first data is a first data length (N).

Figure 3A:
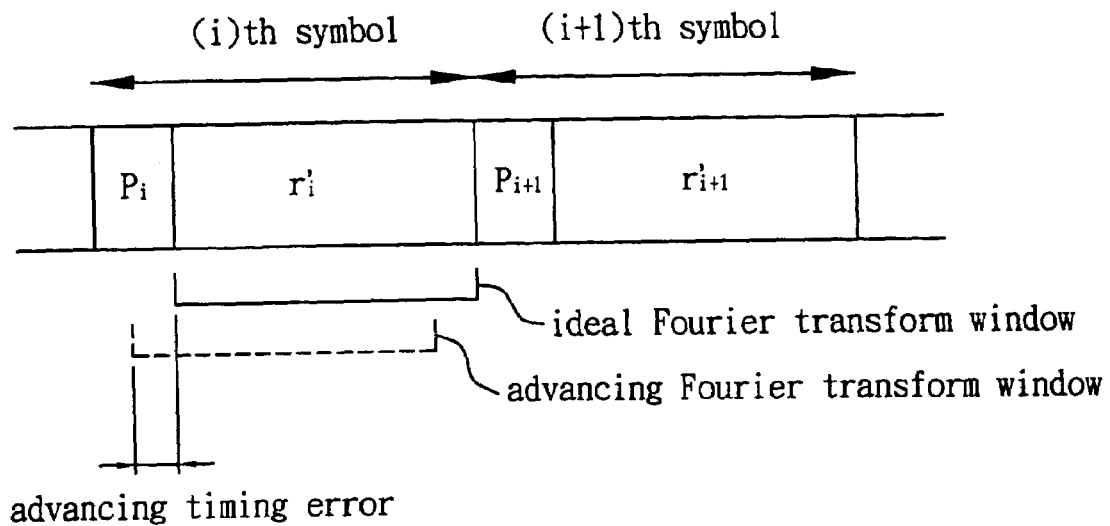
FIG. 3A is a schematic view of an advancing timing error.
Figure 3B:
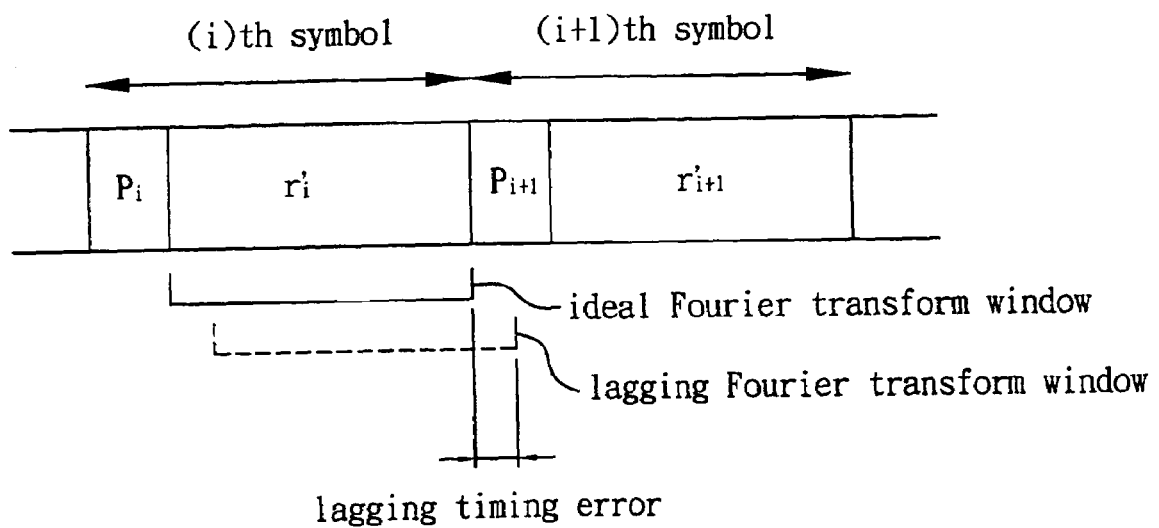
FIG. 3B is a schematic view of a lagging timing error.

With reference to FIGS. 3A and 3B, FIG. 3A is a schematic view showing an advancing timing error, and FIG. 3B is a schematic view showing a lagging timing error. Both the (i)th symbol and the (i+1)th symbol include a CP and a data, wherein, the (i)th symbol has the (i)th CP $P_i$ and the (i)th data $r_i$, and the length of the (i)th data is an (i)th data length N. In an ideal situation, i.e., when the timing synchronization has no timing error, the symbol index indicates the address of the last sample of the (i)th symbol. Therefore, the (i)th data is ideal FFT windows which can be ideally Fourier transformed, and does not have the problem of ISI.

With reference to FIG. 3A, when the timing synchronization can not be achieved, i.e., when the symbol index indicates the address of the sample before the last sample of the (i)th symbol rather than the address of the last sample, an advancing timing error will occur. However, since the CP $P_i$ of the (i)th symbol are duplicated with the data $r_i$ and are associated with the data $r_i$, the advancing FFT window as shown in dashed line will comprise part of the CP and part of the data. When such advancing timing error occurs, the timing error is within the acceptable range.

With reference to FIG. 3B, when the symbol index indicates the address of the sample after the last sample of the (i)th symbol rather than the address of the last sample, i.e., the address of some sample of the CP $P_{i+1}$ of the (i+1)th symbol, a lagging timing error will occur. The lagging FFT window shown in dashed line will comprise part of data $r_i$ of the (i)th symbol and part of the CP $P_{i+1}$ of the (i+1)th symbol. However, since the CP $P_{i+1}$ of the (i+1)th symbol are duplicated with the data $r_{i+1}$ and have no relation with the data $r_i$ of the (i)th symbol, when such lagging timing error occurs, the timing error is certainly beyond the acceptable range. That is, the symbol is affected by the ISI.

To determine whether the symbol has a timing error, and whether the timing error is an advancing timing error or a lagging timing error, the shift register 22 depends on the symbol index and a set value which is the first data length (N). The symbol index minus the set value is a first pointer (n−N), the symbol index is a second pointer (n), and the symbol index plus the set value is a third pointer (n+N). According to the first pointer, the second pointer and the third pointer, a first content value, a second content value and a third content value are obtained from the shift register 22 respectively.

The comparing device 23 is used to compare the first content value, the second content value and the third content value, so as to determine whether the first symbol is interfered. The comparing device comprises a first register 231, a second register 232, a third register 233, a first subtracter 234, a second subtracter 235, a first absolute value extractor 236, a second absolute value extractor 237 and a comparator 238.

The first register 231 is used to store the first content value, which is represented by $reg_s(n-N)$. The second register 232 is used to store the second content value, which is represented by $reg_s(n)$. The third register 233 is used to store the third content value, which is represented by $reg_s(n+N)$. The first subtracter 234 is used to obtain the difference between the second content value and the first content value, as a first difference value. The second subtracter 235 is used to obtain the difference between the second content value and the third content value, as a second difference value. The first absolute value extractor 236 is used to obtain the absolute value of the first difference value. The second absolute value extractor 237 is used to obtain the absolute value of the second difference value. The comparator 238 is used to compare the absolute value of the first difference value with the absolute value of the second difference value. If the absolute value of the first difference value is greater than the absolute value of the second difference value, the first symbol is interfered, and a compensation enabling signal is output to the compensator 24.

The first content value, the second content value and the third content value determine whether the first symbol is interfered. It will be discussed here with respect to the three cases as shown in FIGS. 3A and 3B, wherein the first case is an ideal situation without interference, i.e., where the symbol index is exactly the address of the last sample of the first symbol. Therefore, the first content value is a content value of the CP of the first symbol, and thus the first content value may be approximate to or identical with the second content value. Then the first difference value may be very small or zero. In the first case, the third content value is a content value of the data of the second symbol, so the third content value has no relation with the second content value, and the second difference value may be quite large. Therefore, in the first case, the second difference value will be greater than the first difference value. Thus when the comparator 238 compares the absolute value of the first difference value with the absolute value of the second difference value, if the absolute value of the second difference value is greater than the absolute value of the first difference value, it is indicated that the first symbol has no interference, and there is no need to compensate.

The second case is the situation of an advancing timing error, i.e., where the symbol index is not the address of the last sample of the first symbol, but the address of the sample before the last sample. Therefore, the first content value is a content value of the CP of the first symbol, and thus the first content value may be approximate to or identical with the second content value. Then the first difference value may be very small or zero. In the second case, the third content value is a content value of the data of the second symbol, so the third content value has no relation with the second content value, and the second difference value may be quite large. Therefore, in the second case, the second difference value will be greater than the first difference value. Similarly, when the comparator 238 compares the absolute value of the first difference value with the absolute value of the second difference value, if the absolute value of the second difference value is greater than the absolute value of the first difference value, it is indicated that although the first symbol has an advancing timing error, the advancing timing error is within the acceptable range of the OFDM system and there is no need to compensate.

The third case is the situation of a lagging timing error, that is, where the symbol index is not the address of the last sample of the first symbol, but the address of the sample after the last sample, i.e., the address of a sample of the CP of the second symbol. Therefore, the second content value may be a content value of the CP of the second symbol, while the first content value is a content value of the data of the first symbol, so the first content value may have no relation with the second content value, and the first difference value may be quite large. In the third case, the third content value is a content value of the data of the second symbol, and because the CP of the second symbol are duplicated with the data of the second symbol, the third content value is approximate to or identical with the second content value, and then the second difference value may be very small or zero. Therefore, in the third case, the first difference value will be greater than the second difference value. Thus, when the comparator 238 compares the absolute value of the first difference value with the absolute value of the second difference value, if the absolute value of the first difference value is greater than the absolute value of the second difference value, it is indicated that the first symbol is interfered, and there is a need to compensate, and a compensation enabling signal is output to the compensator 24.

When the first symbol is interfered, the compensator 24 is used to compensate the interfered first symbol. After the compensator 24 receives the compensation enabling signal, it is indicated that the first symbol has the ISI, and the symbol index indicates the address of the sample after the last sample of the first symbol, i.e., the address of a sample of the CP of the second symbol, rather than the address of the last sample of the first symbol. The compensator 24 is used to replace the second content value with the first content value of the shift register 22, i.e., to replace the content of a sample of the CP of the second symbol with the content value of the data of the first symbol. Then, one is further subtracted from the symbol index, to continue to utilize the shift register 22 and the comparing device 23 to determine whether the first symbol still is interfered. And when the first symbol still is interfered, the interfered first symbol is compensated continually until the first symbol has no interference.

Therefore, the symbol timing synchronization system of the invention 20 can detect whether the symbol of the OFDM system has the ISI, and when the symbol has the ISI, automatically compensate the interfered symbol by replacing the sample not in the symbol with the sample in the symbol with less difference. Therefore, depending on the symbol timing synchronization system of the invention, the symbol timing error and the ISI can be essentially removed so as to improve the system performance.

While an embodiment of the present invention has been illustrated and described, various modifications and improvements can be made by those skilled in the art. The embodiment of the present invention is therefore described in an illustrative, but not restrictive, sense. It is intended that the present invention may not be limited to the particular forms as illustrated, and that all modifications which maintain the spirit and scope of the present invention are within the scope as defined in the appended claims.

What is claimed is:

1. A symbol timing synchronization system for OFDM systems, comprising:
   a shift register, for storing a first symbol and a second symbol being adjacent to the first symbol, and for receiving a symbol index; wherein, according to the symbol index and a set value, the symbol index minus the set value being a first pointer, the symbol index being a second pointer, and the symbol index plus the set value being a third pointer; according to the first pointer, the second pointer and the third pointer, a first content value, a second content value and a third content value obtained respectively;
   a comparing device, for comparing the first content value, the second content value and the third content value, so as to determine whether the first symbol is interfered; and
   a compensator to compensate the interfered first symbol if the first symbol is interfered,
   wherein the comparing device comprises:
   a first register, for storing the first content value;
   a second register, for storing the second content value;
   a third register, for storing the third content value;
   a first subtracter, for obtaining the difference between the second content value and the first content value, as a first difference value;
   a second subtracter, for obtaining the difference between the second content value and the third content value, as a second difference value;
   a first absolute value extractor, for obtaining a absolute value of the first difference value;
   a second absolute value extractor, for obtaining a absolute value of the second difference value;
   a comparator for comparing the absolute value of the first difference value with the absolute value of the second difference value: if the absolute value of the first difference value is greater than the absolute value of the second difference value, the first symbol is interfered, and a compensation enabling signal is output to the compensator.

2. The symbol timing synchronization system according to claim 1, wherein the first symbol has a first CP and a first data, and the length of the first data is a first data length.

3. The symbol timing synchronization system according to claim 2, wherein the symbol index is the address of the last sample of the first symbol.

4. The symbol timing synchronization system according to claim 2, wherein the set value is the first data length.

5. The symbol timing synchronization system according to claim 1, wherein the compensator receives the compensation enabling signal, to replace the second content value with the first content value of the shift register, and one is subtracted from the symbol index, to continue to determine whether the first symbol is interfered, and when the first symbol is interfered, to compensate the interfered first symbol.

6. The symbol timing synchronization system according to claim 1, further comprising a maximum likelihood estimator used to produce the symbol index.

* * * * *